(12) United States Patent
Harnik et al.

(10) Patent No.: US 10,650,018 B2
(45) Date of Patent: May 12, 2020

(54) METHOD FOR EFFICIENT DERIVED DATA VIEWS USING BYTE ADDRESSABLE PERSISTENT STORAGE

(71) Applicant: International Business Machines Corporation, Armonk, NY (US)

(72) Inventors: Danny Harnik, Tel Mond (IL); Moshik Hershcovitch, Tel Aviv (IL); Ronen Kat, Kokav-Yair (IL); Yaron Weinsberg, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 15/453,928

(22) Filed: Mar. 9, 2017

(65) Prior Publication Data
US 2018/0260454 A1  Sep. 13, 2018

(51) Int. Cl.
*G06F 16/00* (2019.01)
*G06F 16/25* (2019.01)
*G06F 16/21* (2019.01)

(52) U.S. Cl.
CPC .......... *G06F 16/254* (2019.01); *G06F 16/211* (2019.01); *G06F 16/258* (2019.01)

(58) Field of Classification Search
CPC ......... G06F 12/0804; G06F 2212/1008; G06F 12/0292; G06F 3/0619; G06F 3/064; G06F 3/061; G06F 3/065; G06F 3/0656; G06F 3/067; G06F 3/0689; G06F 16/00; G06F 16/211; G06F 12/023; G06F 12/0813; G06F 12/0815; G06F 12/084; G06F 12/0842; G06F 13/24; G06F 16/219; G06F 16/27; G06F 9/3834; G06F 9/3851; G06F 9/467; G06F 11/08; G06F 11/1004; G06F 12/0811; G06F 12/0875; G06F 12/10; G06F 12/109; G06F 16/254; G06F 16/258; G06F 2212/1024; G06F 2212/214; G06F 2212/455; G06F 2212/651; G06F 2212/7201; G06F 3/0631; G06F 3/0673
See application file for complete search history.

(56) References Cited

U.S. PATENT DOCUMENTS

| 10,019,845 | B2 * | 7/2018 | Fateh | G06T 19/006 |
|---|---|---|---|---|
| 2014/0040199 | A1 * | 2/2014 | Golab | G06F 16/219 |
|  |  |  |  | 707/634 |
| 2015/0220539 | A1 | 8/2015 | Lambert et al. | |
| 2016/0055220 | A1 | 2/2016 | Joshi et al. | |
| 2016/0267147 | A1 | 9/2016 | Seemann et al. | |
| 2018/0004649 | A1 * | 1/2018 | Puthiyedath | G06F 12/0238 |

* cited by examiner

*Primary Examiner* — Yicun Wu
(74) *Attorney, Agent, or Firm* — Dvir Gassner

(57) ABSTRACT

A system to reduce the amount of storage and memory used to maintain derived datasets is disclosed. The system operates by using pointers to the underlying data in persistent, byte-addressable storage media. The system additionally reduces the creation time of the views when storage class memory (SCM) is the underlying storage. Furthermore, the invention relates to a form of compression that is tailored to the use cases of big data analytics. The processes of this disclosure use random access to significantly improve performance.

20 Claims, 3 Drawing Sheets

(1) filename: log.dat

```
Dec 12 23:35:49 vagrant-ubuntu-trusty-64 proxy-server 127.0.0.1 127.0.0.1 12/Dec/2015/23/35/48 GET /v1/AUTH_test/sample-log/sample-log HTTP/1.0 200
Dec 12 23:35:49 vagrant-ubuntu-trusty-64 proxy-server 127.0.0.1 127.0.0.1 12/Dec/2015/23/35/49 GET /v2/AUTH_test/sample-log/sample-log HTTP/1.0 200
Dec 12 23:35:50 vagrant-ubuntu-trusty-64 proxy-server 127.0.0.1 127.0.0.1 12/Dec/2015/23/35/50 PUT /v1/AUTH_test/sample-log/sample-log HTTP/1.0 200
Dec 12 23:35:51 vagrant-ubuntu-trusty-64 proxy-server 127.0.0.1 127.0.0.1 12/Dec/2015/23/35/51 GET /v3/AUTH_test/sample-log/sample-log HTTP/1.0 200
```

— 100

Fig. 1A (2) Openstack swift proxy log schema:

%{SYSLOGTIMESTAMP :date} %{SYSLOGPROG: program} %{HOSTNAME: client} %{HOSTNAME}: %{HOSTIME}: %{NOTSPACE} %{WORD :datetime} %{NOTSPACE :request} HTTP/: %{NUMBER :version}: %{NUMBER: response}

— 120

Fig. 1B (3) Required view schema:

%{HOSTNAME: client} %{WORD: datetime} %{NOTSPACE: request}

METHOD FOR EFFICIENT DERIVED DATA VIEWS USING BYTE ADDRESSABLE PERSISTENT STORAGE

FIELD OF TECHNOLOGY

The present invention relates to the technical field of data views. More particularly, the present invention relates to using byte addressable persistent storage based data views.

BACKGROUND OF THE INVENTION

In many common configurations, big data and analytics do not work with the entire dataset, but rather a subset or derivation of the dataset. Most often, the analysis is done by creating views of the data (subsets of the entire data) in advance. Furthermore, these views are created as part of a pre-processing data ingestion step referred to as Extract, Transform, Load (ETL).

ETL is the process where the original dataset is read, relevant data to the analytic process is extracted, cleaned, transformed and changed to best fit the analytical process and then loaded into the analytics processing system. While such a process assists with running in an efficient manner, it introduces a space overhead for keeping the derived data. Moreover, the process is repeated for each type of analytical process. An example of such a process entails reading the complete dataset, filtering only the necessary data, and copying it to a new file/storage location. As such, the creation of views consumes time and memory, as well as the extra storage space required to store the view since data is essentially duplicated.

SCM is a family of persistent, byte addressable memory which offers low latency and high volume characteristic. There are a growing number of technologies in this family including Flash backed DRAM, 3DXPOINT, MRAM, ReRAM, and others.

Data reduction technologies are used to reduce storage needs. Compression uses in-text back pointers or dictionary table references to reference repeating strings. De-duplication uses pointers to repeated large strings (typically blocks). Compression and de-duplication have drawbacks resulting from the granularity of the repeating patterns. Furthermore, compression techniques are limited in their temporal reference, whereas de-duplication needs a large enough repeated text to be efficient.

In some systems, such as Apache Spark, a data lineage relationship is maintained. In the data lineage relationship, one dataset is described by a set containing a parent dataset, and transformation metatdata. When the dataset is used (e.g., for output), then the dataset is computed by reading the parent data and executing the transformations described in the transformation metadata. The central difference is that such a lineage is not persistent, and cannot be reused for additional computations. If it is persisted, it is kept as an entirely new object, or a snapshot of the memory or cache mechanism, which requires additional storage space. Additionally, the lineage process typically requires reading the entire parent dataset, or at the very least, a large and sequential portion of it.

Therefore, a system to reduce the amount of storage and memory used to maintain the derived datasets as well as reduce the creation time of the views when SCM is the underlying storage is needed.

SUMMARY OF INVENTION

In embodiments, the present invention relates to a form of compression that is tailored to the use cases of big data analytics. The process disclosed uses the underlying random access to significantly improve the performance of such a process.

In an embodiment, an apparatus comprises a persistent, byte-addressable storage medium comprising a first data set, and a view generating controller operatively connected to the storage medium and configured to access the first data set, generate a first set of pointers to elements in the first data set, and provide the first set of pointers to a view. In an optional embodiment, generating the first set of pointers comprises using a schema of the first data set for calculating offsets. In a further optional embodiment, the view generating controller is configured to selectively copy data values from the first data set into the view. In a preferred embodiment, the view translates the first set of pointers into data values by dereferencing the first set of pointers. In an advantageous embodiment, the apparatus further comprises a data access layer configured to control the dereferencing by authenticating a user. In an further advantageous embodiment, the view generating controller is further configured to generate a second set of pointers and provide the second set of pointers to the view, and wherein the second set of pointers point to the elements in the first set of pointers. In an optional embodiment, the view changes automatically when the first data set is updated.

Numerous other embodiments are described throughout herein. All of these embodiments are intended to be within the scope of the invention herein disclosed. Although various embodiments are described herein, it is to be understood that not necessarily all objects, advantages, features or concepts need to be achieved in accordance with any particular embodiment. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

The methods and systems disclosed herein may be implemented in any means for achieving various aspects, and may be executed in a form of a machine-readable medium embodying a set of instructions that, when executed by a machine, cause the machine to perform any of the operations disclosed herein. These and other features, aspects, and advantages of the present invention will become readily apparent to those skilled in the art and understood with reference to the following description, appended claims, and accompanying figures, the invention not being limited to any particular disclosed embodiment(s).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

FIG. 1A illustrates a log file for data access, according to an embodiment of the present invention.

FIG. 1B illustrates a schema of how the data is structured and defined, according to an embodiment of the present invention.

FIG. 1C illustrates a view consisting of a schema, according to an embodiment of the present invention.

Figure 1D:
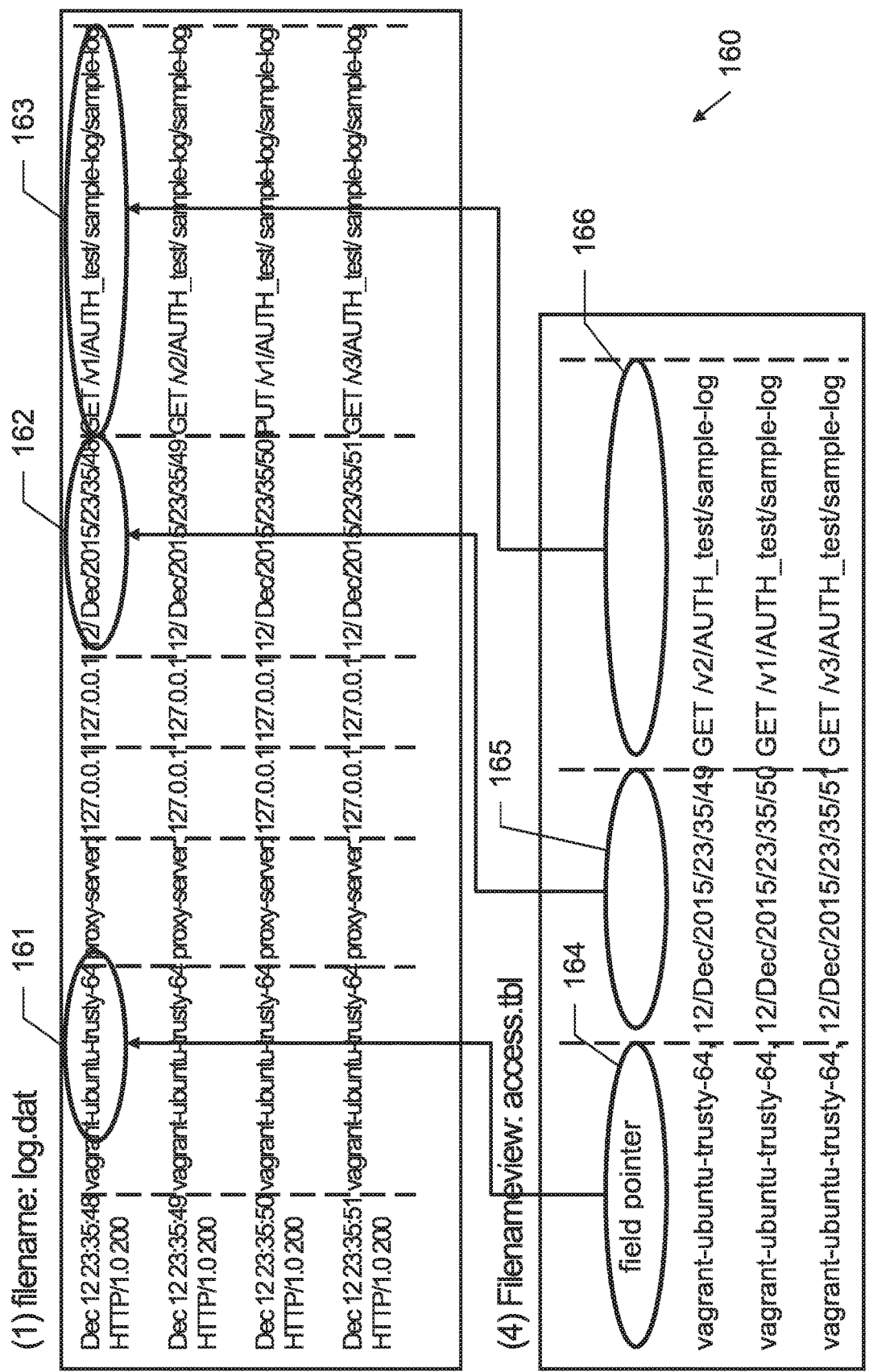
FIG. 1D illustrates the view that was generated for the data of FIG. 1A, according to an embodiment of the present invention.

Other features of the present embodiments will be apparent from the Detailed Description that follows.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical and structural changes may be made to the embodiments without departing from the spirit and scope of the present teachings. The following detailed description is therefore not to be taken in a limiting sense, and the scope of the present disclosure is defined by the appended claims and their equivalents.

The present invention, in embodiments, addresses the creation and use of data views for analytics. These views are extremely useful for analytics but introduce significant overheads of storing and creation of the views. To overcome these overheads, the system creates virtual views taking advantage of the fact that the data is stored in SCM, which is byte addressable. The system can reference chunks (parts) of the data directly.

Instead of keeping a duplicate of the derived (subset) of the data, the system keeps a set of pointers that point to the subset of the data for which access is needed. In this case the view would be a list of pointers to the original data. Namely, when accessing the view, the system performs a lookup process, returning the data pointed by the references.

If the dataset consists of rows of data of fixed length, then a pointer view can keep the relative offset and length of each of the needed fields. This variant has the benefit of not needing to read the actual data in order to create the view (it can be created simply by looking at the schema).

FIG. 1A illustrates a log file 100 for data access, according to an embodiment of the present invention. The system operates on the log file as follows. Given a fixed length dataset and assuming log file access, a data scientist that would like to consume and perform analytics on such a log will read the data from disk, remove unnecessary columns and rows, store the new view, and start the processing flow. Alternatively, the operations can run on a non-persistent version of this view in memory. FIG. 1B illustrates a schema 120 of how the data is structured and defined in an embodiment.

Persistent byte-addressable storage is utilized by the system by creating a view of a file using offsets to real data for which the view is created. For example, the view may consist of the schema presented illustrated in FIG. 1C. FIG. 1C illustrates a view 140 consisting of a schema, according to an embodiment of the present invention. The elements of the view 140 contain pointers 141, 142, 143 that reference the data set. The schema in FIG. 1C is a subset of the schema of FIG. 1B.

The system uses the view schema to generate a new view of the original data. FIG. 1D illustrates the view that was generated for the data shown in FIG. 1A, according to an embodiment of the present invention.

The data used in FIGS. 1A-1D were for a structured dataset with fixed row length. For variable length datasets or semi-structured datasets there are various options. For example, one can use a list of absolute pointers to the original dataset. Each entry in the view will have an offset and length field. Alternatively, one can hold an offset to the beginning of each row and for each entry hold a relative offset in the row (plus a length). This way a "heavy" absolute pointer is kept just once per each row, and the rest of the pointers are "light" relative pointers. Other similar variations can be used as well.

Views may be constructed based on a filtering criteria (e.g., all rows that contain a specific country name). In this case, the view creation requires a scan of the data (using existing indexing of the data), but the format can remain very similar to the variations described above.

Views may contain a combination of data and pointers. For example, if a data field is very short, it can be copied to the view as is, instead of a pointer. Holding a pointer is beneficial to the overall storage space only if the representation of the pointer and length are shorter than the field itself. Note that in some cases, the storage capacity is not the only criteria.

In some embodiments (mainly for structured data), a schema of the view can be stored, and this schema can be used to create additional sub-views from the original view. For example, in the filtering case, one can first filter according to a country name, a second filtering can be done more efficiently by only looking at the results of the first filtering rather than the original view.

In addition, the system can hold a nested view, where the pointers in a second view, point to locations (pointers) in the first view.

An additional benefit for the case of structured data and SELECT operations is that a view can be kept relevant even if data in the original data is modified or deleted. In such a case, the original dataset is changed but the view remains the same. Deletions in the original dataset can be replaced by NULL entries. Note that this practice can work as long as the data lengths remain constant, so there is no change in the data offsets. Note also that this is relevant to updates that do not change the filtering criteria of the data (e.g., in the filtering by Country example, one cannot modify the Country field, but can support changes to other fields).

In other embodiments, privacy solutions can be integrated into the views. In such an embodiment, a single view will hold a more complex description by which different users will get a different outcome of this view. For example, one user will get full access to the view, while a different user with different credentials will only see a portion of the fields. The others fields can be masked, omitted, or encrypted. This privacy solution can be handled by the view generating controller or by the data access layer (or by a combination of both of these). By controlling the values retrieved when dereferencing the pointers in the view, the data can be masked from particular users.

Figure 2:
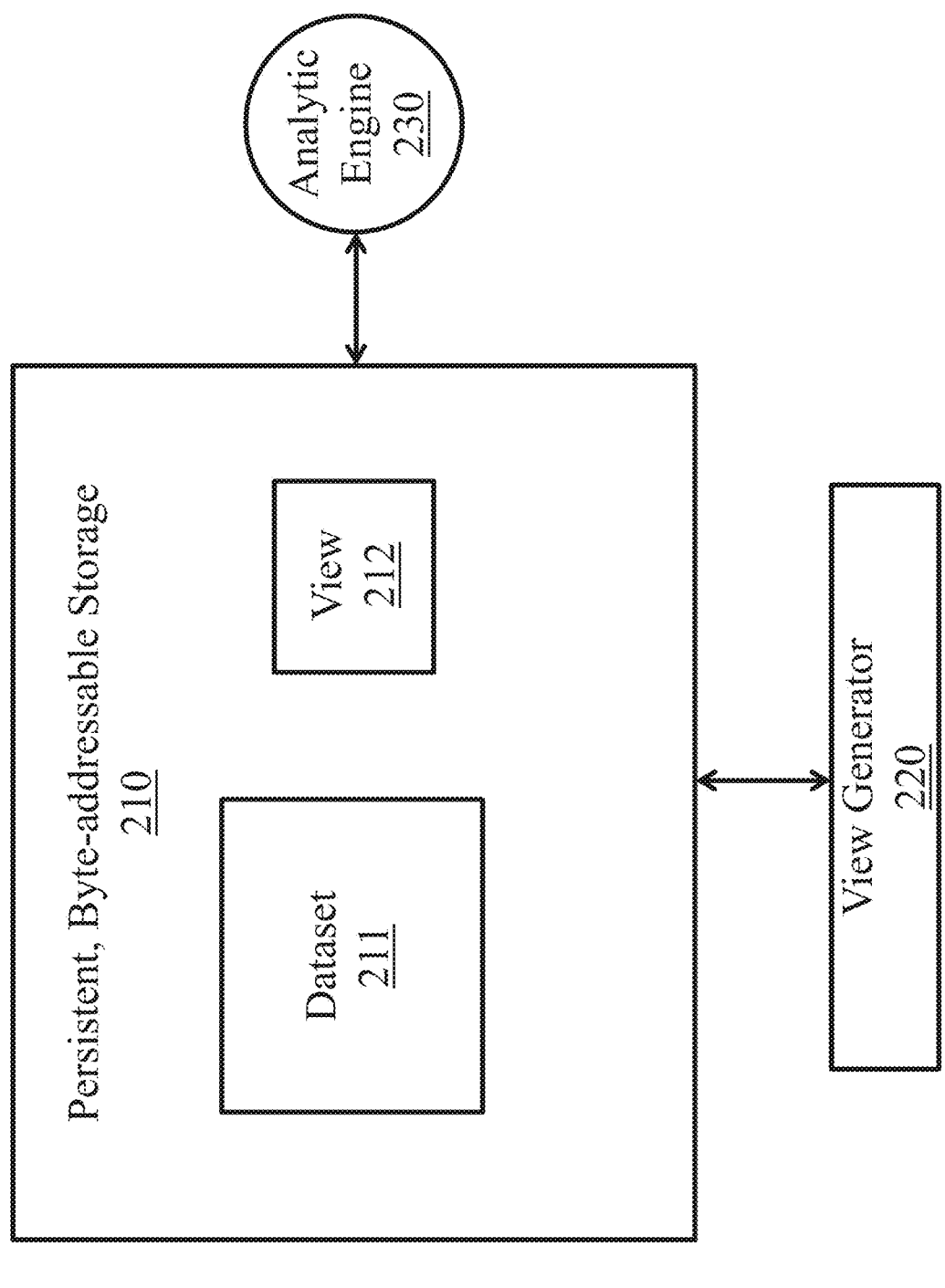
FIG. 2 illustrates the overall system architecture, according to an embodiment of the present invention.

The overall system architecture 200 is shown in FIG. 2, according to an embodiment. The original dataset 211 and the view 212 are contained in a persistent byte addressable storage medium 210. The persistent byte addressable storage medium 210 may be a Storage Class Memory (SCM) device or other non-volatile memory device. The view generator 220 connects to the persistent byte addressable storage medium 210 to create the view 212 from the dataset 211 using the above described processes. Once the view 212 has been created, an analytics engine 230 connected to the persistent byte addressable storage medium 210 can perform data analytics via the view and a data access layer. The analytics engine 230 may be Apache Spark, Hadoop, or other big data analytics engine.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. An apparatus comprising:
a persistent, byte-addressable storage medium comprising storage-class memory, the storage medium storing a first data set; and
a view generating controller operatively connected to the storage medium and configured to:
access the first data set and generate a new view of the first dataset, the view comprising a first set of pointers to real data for which the view is generated in the first data set, the pointers based on offsets to the real data in the first dataset, and
provide the first set of pointers to the real data as the new view.

2. The apparatus of claim 1, wherein generating the first set of pointers comprises using a schema of the first data set for calculating offsets.

3. The apparatus of claim 1, wherein the view generating controller is configured to selectively copy data values from the first data set into the view.

4. The apparatus of claim 1, wherein the view translates the first set of pointers into data values by dereferencing the first set of pointers.

5. The apparatus of claim 4, further comprising a data access layer configured to control the dereferencing by authenticating a user.

6. The apparatus of claim 1, wherein the view generating controller is further configured to generate a second set of pointers and provide the second set of pointers to the view, and wherein the second set of pointers point to the elements in the first set of pointers.

7. The apparatus of claim 1, wherein the view changes automatically when the first data set is updated.

8. A system comprising:
a persistent, byte-addressable storage device comprising at least one data set;
a view generating controller connected to the storage medium and configured to:
access the at least one data set,
perform data transformation on the at least one data set,
generate a set of pointers referencing real data for which a view is generated in the at least one data set, and
compose the set of pointers to the real data to form the view; and
an analytics engine connected to the storage medium and configured to retrieve a data value by dereferencing a pointer in the set of pointers to obtain the real data.

9. The system of claim 8, wherein generating a set of pointers comprises using a schema of the data set and calculating offsets.

10. The system of claim 8, wherein the view generating controller is configured to copy elements of the transformed at least one data set into the view.

11. The system of claim 8, wherein the view translates the set of pointers into data values by dereferencing the first set of pointers.

12. The system of claim 11, wherein the storage medium controls the dereferencing by authenticating a user.

13. The system of claim 8, wherein view generating controller updates the view based on changes in the transformed at least one data set.

14. The system of claim 8, wherein the set of pointers comprises a nested set of pointers.

15. A method comprising:
extracting a data set from a persistent, byte-addressable storage medium;
generating a set of pointers referencing real data for which a view is generated in the data set, wherein the set of pointers comprises a relative offset to the real data and a length of fields;
creating a view comprising the set of pointers to the real data; and
providing the view to an analytics engine.

16. The method of claim 15, wherein providing the view to an analytics engine comprises dereferencing the set of pointers to produce data values.

17. The method of claim 15, wherein providing the view to an analytics engine comprises authenticating a user.

18. The method of claim 15, further comprising:
copying data values from the data set into view.

19. The method of claim 15, further comprising:
updating the view based on changes in the data set.

20. The method of claim 15, wherein the set of pointers comprises a nested set of pointers.

* * * * *